US012736469B2

(12) United States Patent
Saitoh et al.

(10) Patent No.: US 12,736,469 B2

(45) Date of Patent: Sep. 15, 2026

(54) OPTICAL ELEMENT AND OPTICAL SENSOR

(71) Applicant: FUJIFILM Corporation, Tokyo (JP)

(72) Inventors: Yukito Saitoh, Minamiashigara (JP); Hiroshi Sato, Minamiashigara (JP)

(73) Assignee: FUJIFILM Corporation, Tokyo (JP)

(*) Notice: Subject to any disclaimer, the term of this patent is extended or adjusted under 35 U.S.C. 154(b) by 333 days.

(21) Appl. No.: 18/497,258

(22) Filed: Oct. 30, 2023

(65) Prior Publication Data

US 2024/0085320 A1 Mar. 14, 2024

Related U.S. Application Data

(63) Continuation of application No. PCT/JP2022/020195, filed on May 13, 2022.

(30) Foreign Application Priority Data

May 14, 2021 (JP) ................................ 2021-082473

(51) Int. Cl.
*G01N 21/41* (2006.01)

(52) U.S. Cl.
CPC ................................ *G01N 21/4133* (2013.01)

(58) Field of Classification Search
None
See application file for complete search history.

(56) References Cited

U.S. PATENT DOCUMENTS

2008/0316485 A1* 12/2008 Wawro .................... G02B 6/34 356/128
2016/0341858 A1 11/2016 Magnusson
(Continued)

FOREIGN PATENT DOCUMENTS

JP 2020-139972 A 9/2020
WO WO 2021/075180 A1 4/2021

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2022/020195, dated Nov. 23, 2023.
(Continued)

*Primary Examiner* — Ryan Crockett
(74) *Attorney, Agent, or Firm* — Birch, Stewart, Kolasch & Birch, LLP

(57) ABSTRACT

Provided are an optical element that causes a guided-mode resonance phenomenon to occur using a liquid crystal diffraction element to reflect light in a specific wavelength range such that the reflection wavelength range can be widened and the controllability of the width of the reflection wavelength range is also excellent, and an optical sensor including the above-described optical element. The optical element includes a liquid crystal layer that is formed of a composition including a liquid crystal compound, in which the liquid crystal layer has a liquid crystal alignment pattern in which a direction of an optical axis derived from the liquid crystal compound changes while continuously rotating in at least one in-plane direction, the liquid crystal compound is twisted and aligned in a thickness direction, and the liquid crystal layer further has a resonance structure.

5 Claims, 5 Drawing Sheets

(56) References Cited

U.S. PATENT DOCUMENTS

| | | | | |
|---|---|---|---|---|
| 2018/0113309 | A1* | 4/2018 | Robbins | H04N 13/337 |
| 2018/0143438 | A1* | 5/2018 | Oh | G02B 6/0016 |
| 2018/0164627 | A1* | 6/2018 | Oh | G02F 1/011 |
| 2018/0239177 | A1* | 8/2018 | Oh | G02B 6/0088 |
| 2019/0025205 | A1* | 1/2019 | Kristensen | G01N 21/0303 |
| 2020/0386932 | A1* | 12/2020 | Sato | G02B 5/3016 |
| 2021/0149095 | A1* | 5/2021 | Sato | G02B 1/11 |
| 2021/0149248 | A1* | 5/2021 | Saitoh | G02B 5/3016 |
| 2021/0181513 | A1* | 6/2021 | Yanai | G02F 1/13718 |
| 2021/0311259 | A1* | 10/2021 | Sato | G02B 6/0016 |
| 2021/0382215 | A1 | 12/2021 | Kawashita et al. | |
| 2022/0099872 | A1* | 3/2022 | Sasata | G02B 5/1833 |
| 2022/0236587 | A1* | 7/2022 | Yanai | G02B 5/3016 |
| 2023/0161200 | A1* | 5/2023 | Saitoh | G02B 5/18 349/1 |
| 2024/0085607 | A1* | 3/2024 | Sato | G02B 27/02 |
| 2024/0094579 | A1* | 3/2024 | Mitobe | G02F 1/13718 |
| 2024/0319420 | A1* | 9/2024 | Saitoh | G02F 1/13 |
| 2025/0237610 | A1* | 7/2025 | Mendez-Mata | G01N 21/7743 |
| 2025/0237918 | A1* | 7/2025 | Saitoh | G01N 21/41 |

OTHER PUBLICATIONS

International Search Report (Form PCT/ISA/210) for International Application No. PCT/JP2022/020195, dated Aug. 2, 2022, with English translation.

Yang et al., "Polarization independent guided-mode resonance in liquid crystal-based polarization gratings," OSA Continuum, vol. 3, No. 11/15, Nov. 2020, pp. 3107-3115.

Japanese Office Action for corresponding Japanese Application No. 2023-521259, dated May 12, 2026, with English translation.

* cited by examiner

OPTICAL ELEMENT AND OPTICAL SENSOR

CROSS-REFERENCE TO RELATED APPLICATIONS

This application is a Continuation of PCT International Application No. PCT/JP2022/020195 filed on May 13, 2022, which claims priority under 35 U.S.C. § 119(a) to Japanese Patent Application No. 2021-082473 filed on May 14, 2021. The above applications are hereby expressly incorporated by reference, in their entirety, into the present application.

BACKGROUND OF THE INVENTION

1. Field of the Invention

The present invention relates to an optical element used for an optical sensor or the like and an optical sensor including the optical element.

2. Description of the Related Art

As an optical element using an optical phenomenon by a fine structure of a thing, an optical element (optical device) using a guided-mode resonance phenomenon is known.

The optical element using the guided-mode resonance phenomenon is a diffraction element (diffraction grating) including a subwavelength grating where a period in a periodic structure is shorter than a wavelength of target light.

In a case where light is incident into the subwavelength grating, emission of diffracted light to an incidence side is suppressed. On the other hand, due to a difference in refractive index from that in the surroundings, light in a specific wavelength range is guided while being repeatedly reflected, and thus resonance occurs. As a result of the occurrence of the resonance, the light having the specific wavelength is strongly emitted as reflected light.

As described in JP2020-139972A, the optical element using the guided-mode resonance phenomenon is used, for example, for a wavelength selective filter.

As a method of manufacturing the optical element, a manufacturing method using a semiconductor manufacturing technique is known. However, this manufacturing method has a problem in that it is complicated.

On the other hand, as the optical element using the guided-mode resonance phenomenon that can be easily prepared, for example, Zhiyong Yang et al., Polarization independent guided-mode resonance in liquid crystal-based polarization gratings, Vol. 3, No. 11/15 November 2020, OSA Continuum, pp. 3107-3115 describes an optical element using a liquid crystal diffraction element.

SUMMARY OF THE INVENTION

The optical element that causes the guided-mode resonance phenomenon to occur disclosed in Zhiyong Yang et al., Polarization independent guided-mode resonance in liquid crystal-based polarization gratings, Vol. 3, No. 11/15 November 2020, OSA Continuum, pp. 3107-3115 includes a liquid crystal layer having a liquid crystal alignment pattern in which an optical axis derived from a liquid crystal compound continuously rotates in one in-plane direction. This liquid crystal layer acts as a liquid crystal diffraction element having a subwavelength grating.

This optical element guides light in the liquid crystal layer. Therefore, the liquid crystal layer is configured to be sandwiched between an incidence medium and a transmitted medium having a lower refractive index than the liquid crystal layer.

The liquid crystal layer can be prepared by applying a composition including a liquid crystal compound to an alignment film having an alignment pattern corresponding to the liquid crystal alignment pattern to be formed. Therefore, the liquid crystal layer can be prepared more easily than the optical element using the semiconductor device manufacturing technique described in JP2020-139972A.

However, the optical element that causes the guided-mode resonance phenomenon to occur using the liquid crystal diffraction element as described in Zhiyong Yang et al., Polarization independent guided-mode resonance in liquid crystal-based polarization gratings, Vol. 3, No. 11/15 November 2020, OSA Continuum, pp. 3107-3115 has a problem in that a wavelength range of reflected light to be selectively reflected is narrow and the controllability of the reflection wavelength range is not sufficient.

An object of the present invention is to solve the above-described problem of the related art and to provide an optical element that causes a guided-mode resonance phenomenon to occur using a liquid crystal diffraction element to selectively reflect light in a specific wavelength range such that the reflection wavelength range can be widened and the controllability of the width of the reflection wavelength range is also excellent, and a optical sensor including the optical element.

In order to achieve the object, the present invention has the following configurations.

[1] An optical element comprising:

a liquid crystal layer that is formed of a composition including a liquid crystal compound, in which the liquid crystal layer has a liquid crystal alignment pattern in which a direction of an optical axis derived from the liquid crystal compound changes while continuously rotating in at least one in-plane direction, and the liquid crystal compound is twisted and aligned in a thickness direction, and the liquid crystal layer has a resonance structure.

[2] The optical element according to [1], in which in the liquid crystal layer, a twisted angle of the liquid crystal compound in the thickness direction is 10° to 120°.

[3] The optical element according to [1], in which the liquid crystal layer is obtained by immobilizing a cholesteric liquid crystalline phase.

[4] An optical sensor comprising:

the optical element according to any one of [1] to [3].

[5] A method of measuring a refractive index, in which a liquid crystal layer is formed of a composition including a liquid crystal compound, the liquid crystal layer has a liquid crystal alignment pattern in which a direction of an optical axis derived from the liquid crystal compound changes while continuously rotating in at least one in-plane direction, the liquid crystal compound is twisted and aligned in a thickness direction, the liquid crystal layer further has a resonance structure, a relationship between a refractive index of a material disposed on the liquid crystal layer and a position of a peak wavelength of reflected light is grasped in advance as reference data, and an object to be measured of which a refractive index is not known is disposed on the liquid crystal layer and a position of a peak wavelength of reflected light is measured to acquire the refractive index of the object to be measured.

[6] The method of measuring a refractive index according to [5], in which a difference between an average refractive index of the liquid crystal layer and the refractive index of the object to be measured is 0.05 to 0.3.

According to the present invention, in the optical element that causes a guided-mode resonance phenomenon to occur using a liquid crystal diffraction element to selectively reflect light in a specific wavelength range, the reflection wavelength range can be widened and the controllability of the width of the reflection wavelength range can also be improved.

DESCRIPTION OF THE PREFERRED EMBODIMENTS

Hereinafter, an optical element and an optical sensor according to the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field.

Figure 1:
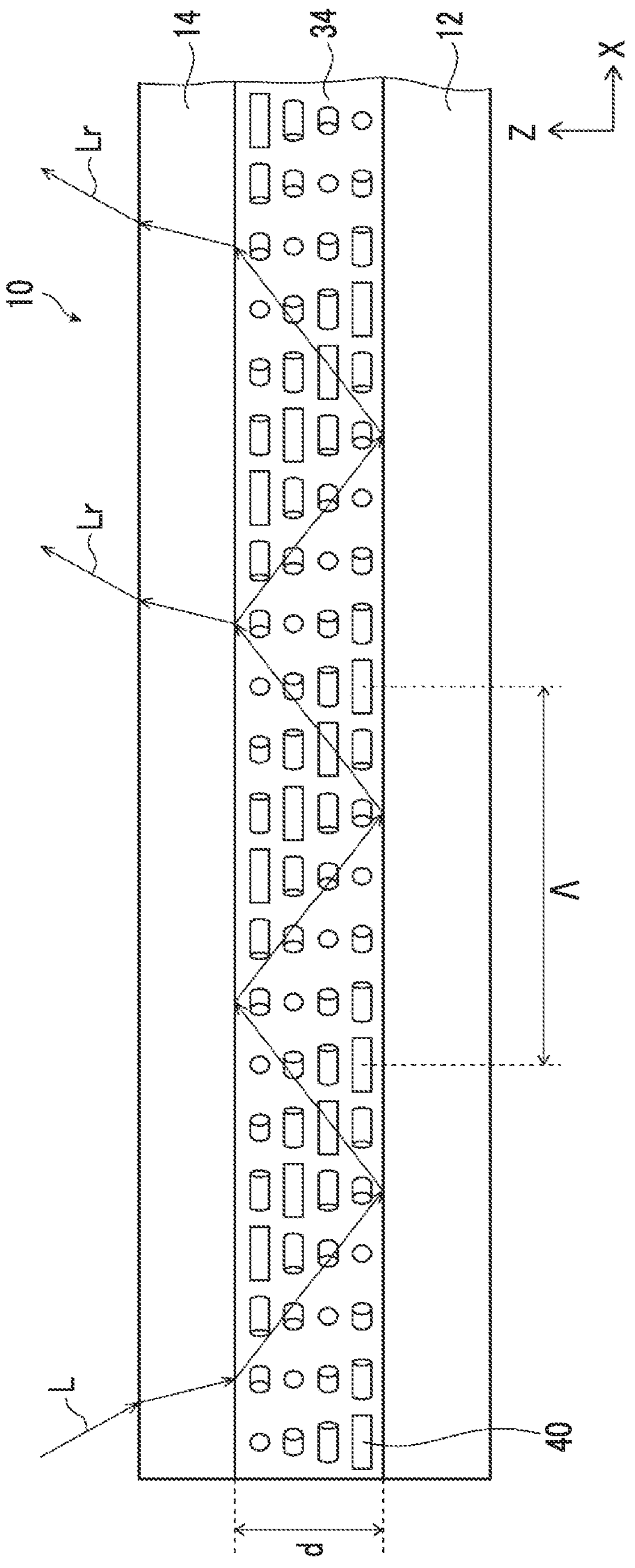
FIG. 1 is a diagram conceptually showing an example of an optical element according to the present invention.

FIG. 1 is a diagram conceptually showing an example of the optical element according to the embodiment of the present invention.

An optical element 10 shown in FIG. 1 includes a first sheet 12, a second sheet 14, and a liquid crystal layer 34 sandwiched between the first sheet and the second sheet 14.

Figure 2:
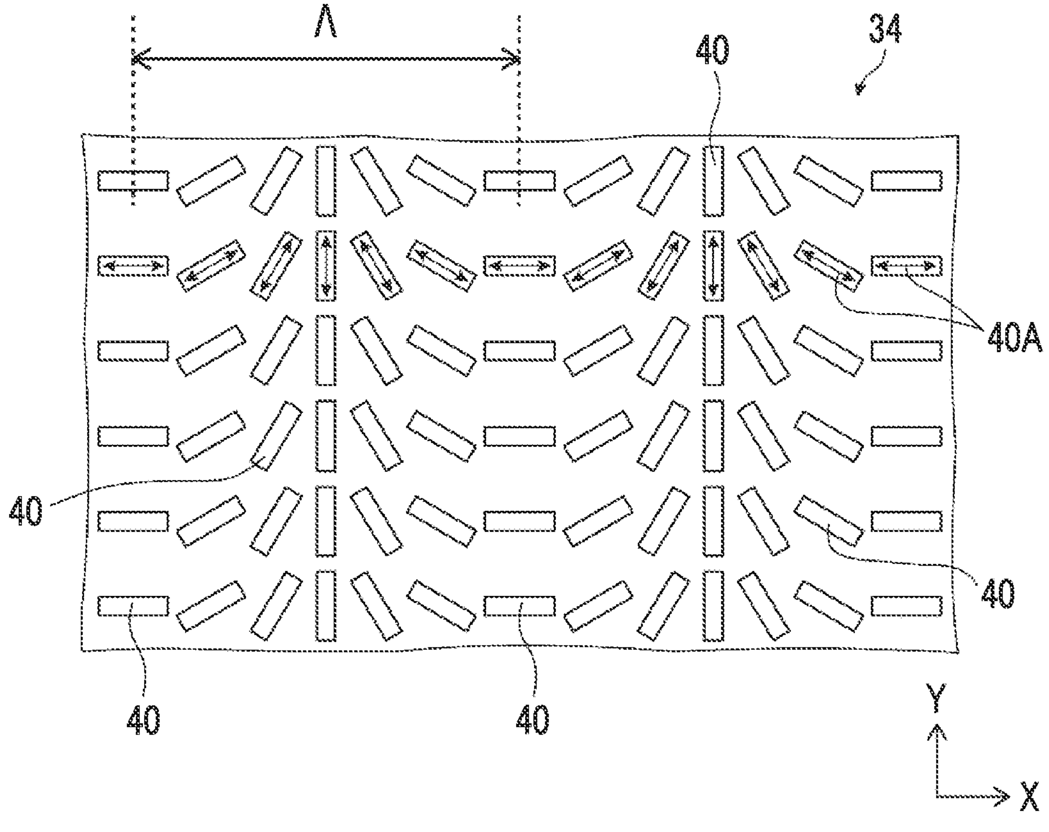
FIG. 2 is a conceptual diagram showing a liquid crystal alignment pattern in a liquid crystal layer of the optical element according to the present invention.

In the optical element 10 according to the embodiment of the present invention, as conceptually shown in FIGS. 1 and 2, the liquid crystal layer 34 has a liquid crystal alignment pattern in which a direction of an optical axis 40A derived from a liquid crystal compound 40 changes while continuously rotating in one in-plane direction (X direction). FIG. 2 is a diagram conceptually showing the liquid crystal alignment pattern in a plane (plane direction of a main surface) of the liquid crystal layer 34.

In addition, the liquid crystal layer 34 has a resonance structure that causes the above-described guided-mode resonance phenomenon to occur.

Further, as shown in FIG. 1, in the liquid crystal layer 34, the liquid crystal compound 40 is twisted and aligned in a thickness direction (Z direction). That is, the thickness direction of the liquid crystal layer 34 is a laminating direction of the first sheet 12, the liquid crystal layer 34, and the second sheet 14.

This liquid crystal layer 34 will be described below.

The optical element 10 in the example shown in the drawing has a configuration in which the liquid crystal layer 34 is sandwiched between the first sheet 12 and the second sheet 14.

The first sheet 12 and the second sheet 14 are sheet-shaped materials having a lower refractive index than the liquid crystal layer 34. The optical element 10 has the above-described configuration such that incident light L is guided (propagated) in the liquid crystal layer 34 while being repeatedly totally reflected. Here, the refractive index of the liquid crystal layer 34 is an average refractive index of the liquid crystal compound.

The first sheet 12 and the second sheet 14 are not particularly limited, and various well-known sheet-shaped materials (films, layers, or plate-shaped materials) can be used as long as they have a lower refractive index than the liquid crystal layer 34.

Accordingly, each of the first sheet 12 and the second sheet 14 may have a monolayer structure or a multilayer structure.

Examples of the first sheet 12 and the second sheet 14 having a monolayer structure include sheets formed of glass or various resin materials such as triacetyl cellulose (TAC), polyethylene terephthalate (PET), polycarbonates, polyvinyl chloride, acryl, or polyolefin.

Examples of the first sheet 12 and the second sheet 14 having a multilayer structure include a sheet including: one of the above-described sheets having a monolayer structure that is provided as a substrate; and another layer that is provided on a surface of the substrate.

Examples of the first sheet 12 and the second sheet 14 include a sheet consisting of a substrate and a bonding layer, in which the substrate is bonded to the liquid crystal layer 34 using the bonding layer.

The bonding layer may be a layer formed of an adhesive, may be a layer formed of a pressure sensitive adhesive, or a layer formed of a material having properties of both of an adhesive or a pressure sensitive adhesive as long as it has a sufficient light-transmitting property. The adhesive has fluidity during bonding and is subsequently solidified. The pressure sensitive adhesive is a gelled (rubber-like) flexible solid during bonding, and the gelled state does not change subsequently.

Accordingly, the bonding layer may be any well-known layer that is used for bonding a sheet-shaped material in various optical devices, for example, an optical clear adhesive (OCA), an optically transparent double-sided tape, or an ultraviolet curable resin.

A transmittance of the first sheet 12 and the second sheet 14 with respect to corresponding light is preferably 50% or more, more preferably 70% or more, and still more preferably 85% or more.

The thickness of the first sheet 12 and the second sheet 14 is not particularly limited and may be appropriately set depending on the use of the optical element 10, a material for forming the first sheet 12 and the second sheet 14, a layer configuration of the first sheet 12 and the second sheet 14, and the like.

In addition, the first sheet 12 and the second sheet 14 may be the same as or different from each other.

In the optical element according to the embodiment of the present invention, the liquid crystal layer 34 and the medium in contact with the main surface of the liquid crystal layer 34 are not particularly limited as long as the liquid crystal layer 34 has a higher refractive index. Accordingly, in the optical element according to the embodiment of the present invention, the medium in contact with the main surface of the liquid crystal layer 34 may be gas such as an air layer (atmosphere).

That is, the optical element according to the embodiment of the present invention may include the liquid crystal layer 34 and any one of the first sheet 12 or the second sheet 14, or may be configured by only the liquid crystal layer 34.

The main surface is the maximum surface of a sheet-shaped material (a film, a plate-shaped material, or a layer) and corresponds to both surfaces in a thickness direction of the sheet-shaped material.

In the optical element 10, the liquid crystal layer 34 is provided between the first sheet 12 and the second sheet 14.

As conceptually shown in FIGS. 1 and 2, the liquid crystal layer 34 has the liquid crystal alignment pattern in which the direction of the optical axis 40A derived from the liquid crystal compound 40 changes while continuously rotating in the one in-plane direction. In addition, in the following description, "the optical axis derived from the liquid crystal compound" will also be simply referred to as "the optical axis of the liquid crystal compound" or "the optical axis".

Specifically, as shown in FIG. 2, in the plane direction of the main surface of the liquid crystal layer 34, the liquid crystal compounds 40 are arranged in the X direction and a Y direction orthogonal to each other. In FIG. 1, the Y direction is a direction orthogonal to the paper plane.

In addition, the direction of the optical axis 40A of the liquid crystal compound 40 changes while continuously rotating in the X direction that is the one in-plane direction of the liquid crystal layer 34. In addition, in the Y direction, the liquid crystal compounds 40 in which the directions of the optical axes 40A are the same are aligned at regular intervals.

As shown in FIG. 1, in the liquid crystal layer 34, the liquid crystal compound 40 is twisted and aligned and laminated in the thickness direction (Z direction). In FIG. 2, the thickness direction, that is, the Z direction is a direction orthogonal to the paper plane.

"The direction of the optical axis 40A of the liquid crystal compound 40 changes while continuously rotating in the one in-plane direction" represents that angles between the optical axes 40A and the X direction vary depending on positions in the X direction and the angle between the optical axis 40A and the X direction gradually changes from $\theta$ to $\theta+180°$ or $\theta-180°$ in the X direction. That is, in each of the plurality of liquid crystal compounds 40 arranged in the X direction, as shown in FIG. 2, the optical axis 40A changes in the X direction while rotating on a given angle basis.

A difference between the angles of the optical axes 40A adjacent to each other in the X direction is not particularly limited and is preferably 45° or less, more preferably 15° or less, and still more preferably less than 15°.

In addition, in the present invention, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the example shown in the drawing, a rod-like liquid crystal compound is shown as the liquid crystal compound 40.

In the liquid crystal layer 34, in the liquid crystal alignment pattern of the liquid crystal compound 40, the length (distance) over which the optical axis 40A of the liquid crystal compound 40 rotates by 180° in the X direction in which the optical axis 40A changes while continuously rotating in a plane is a single period in the liquid crystal alignment pattern.

That is, a distance between centers of two liquid crystal compounds 40 in the X direction is the single period in the liquid crystal alignment pattern, the two liquid crystal compounds having the same angle in the X direction. Specifically, as shown in FIG. 2, a distance between centers in the X direction of two liquid crystal compounds 40 in which the X direction and the direction of the optical axis 40A match each other is the single period in the liquid crystal alignment pattern.

In the liquid crystal alignment pattern of the liquid crystal layer 34, the single period is repeated in the X direction, that is, in the one in-plane direction in which the direction of the optical axis 40A changes while continuously rotating.

As described above, the liquid crystal layer 34 acts as a liquid crystal diffraction element. In the liquid crystal layer 34, the single period in the liquid crystal alignment pattern is a period $\Lambda$ (single period $\Lambda$) in a periodic structure of the diffraction element (diffraction grating).

Here, the liquid crystal layer 34 has a resonance structure that causes the above-described guided-mode resonance phenomenon to occur. Accordingly, the liquid crystal layer 34 acts as a diffraction grating having a subwavelength grating where the period $\Lambda$ is shorter than a wavelength of light to be selectively reflected from the optical element 10 (liquid crystal layer 34).

This point will be described below.

On the other hand, in the liquid crystal compound 40 forming the liquid crystal layer 34, the directions of the optical axes 40A are the same in the Y direction orthogonal to the X direction, that is, the Y direction perpendicular to the one in-plane direction in which the optical axis 40A continuously rotates.

In other words, in the liquid crystal compound 40 forming the liquid crystal layer 34, angles between the optical axes 40A of the liquid crystal compound 40 and the X direction are the same in the Y direction.

The liquid crystal layer 34 having the liquid crystal alignment pattern can be formed, for example, using an alignment film for aligning a liquid crystal compound 40 to the predetermined liquid crystal alignment pattern, the alignment film having an alignment pattern corresponding to the liquid crystal alignment pattern.

In the optical element according to the embodiment of the present invention, this alignment film may used as any one of the first sheet 12 or the second sheet 14 as described above.

As the alignment film, various well-known films can be used as long as they can align the liquid crystal compound. Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-97377A, JP2005-99228A, and JP2005-128503A is preferable.

The alignment film can be suitably used as a so-called photo-alignment film obtained by irradiating a photo-alignment material with polarized light or non-polarized light. That is, a photo-alignment film that is formed by applying a photo-alignment material to a substrate is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007 -140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997 -118717A (JP-H9-118717A), JP1998-506420A (JP-H10-506420A), JP2003 -505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

A thickness of the alignment film is not particularly limited. The thickness with which a required alignment function can be obtained may be appropriately set depending on the material for forming the alignment film.

A method of forming the alignment film is not limited. Any one of various well-known methods corresponding to a material for forming the alignment film can be used. Examples thereof include a method including: applying the alignment film to a surface of a substrate; drying the applied alignment film; and exposing the alignment film to laser light to form an alignment pattern.

Figure 3:
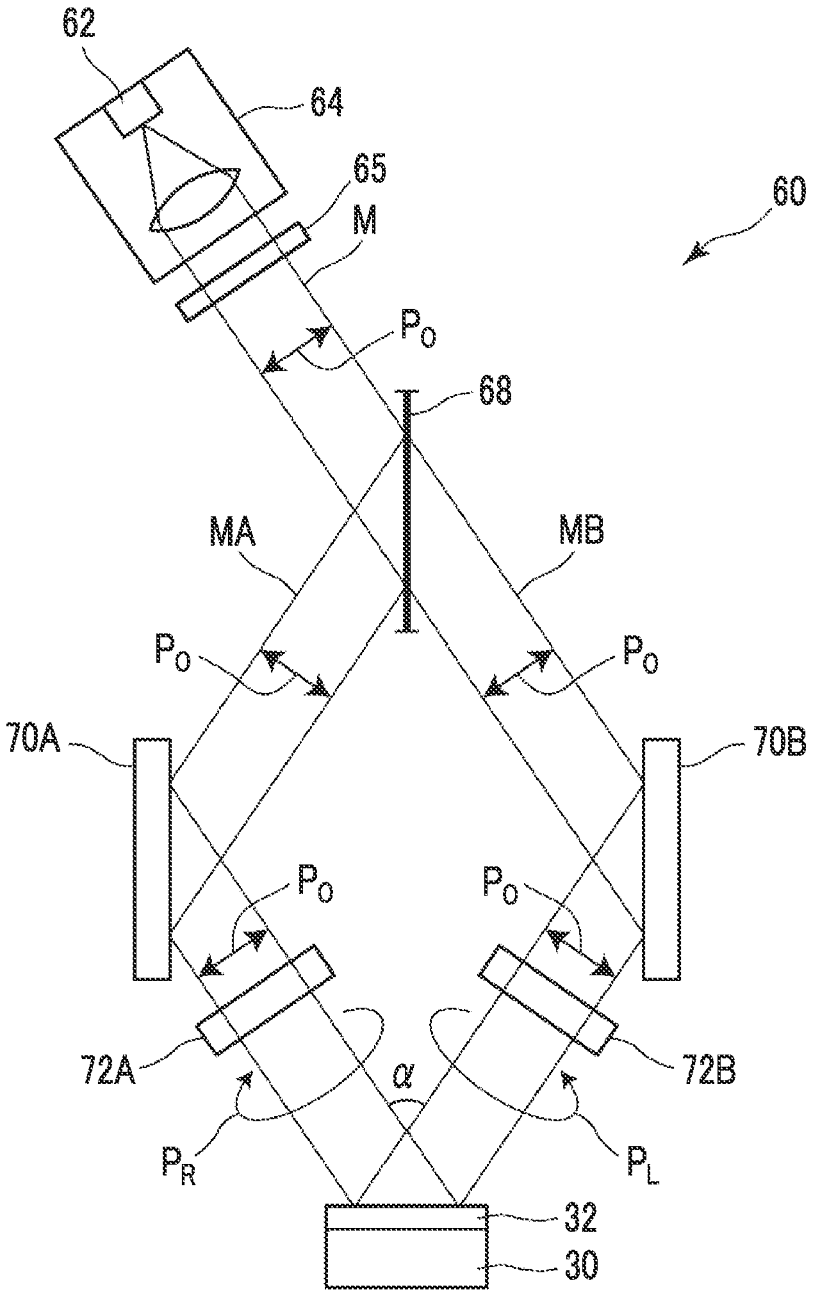
FIG. 3 is a conceptual diagram showing an example of an exposure device that exposes an alignment film.

FIG. 3 conceptually shows an example of an exposure device that exposes the alignment film to form an alignment pattern. FIG. 3 shows an example where an alignment film 32 formed on a surface of a substrate 30 is exposed.

An exposure device 60 shown in FIG. 3 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; minors 70A and 70B that are disposed on optical paths of the split two beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The alignment film 32 on which the alignment pattern is not yet formed is disposed at an exposure position, the two beams MA and MB intersect and interfere with each other on the alignment film, and the alignment film 32 is irradiated with and exposed to the interference light.

Due to the interference in this case, the polarization state of light with which the alignment film is irradiated periodically changes according to interference fringes. As a result, an alignment film having an alignment pattern in which the alignment state periodically changes can be obtained. In the following description, this alignment film having the alignment pattern will also be referred to as "patterned alignment film".

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the liquid crystal layer 34 on the alignment film having the alignment pattern in which the alignment state periodically changes, as described below, the liquid crystal layer 34 having the liquid crystal alignment pattern in which the optical axis 40A of the liquid crystal compound 40 continuously rotates in the one in-plane direction can be formed.

In addition, by rotating the optical axes of the λ/4 plates 72A and 72B by 90°, respectively, a rotation direction of the optical axis 40A can be reversed.

As described above, the patterned alignment film has a liquid crystal alignment pattern in which the liquid crystal compound is aligned such that the direction of the optical axis of the liquid crystal compound in the liquid crystal layer formed on the patterned alignment film changes while continuously rotating in at least one in-plane direction.

In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

As described above, as conceptually shown in FIGS. 1 and 2, the liquid crystal layer 34 has the liquid crystal alignment pattern in which the direction of the optical axis 40A derived from the liquid crystal compound 40 changes while continuously rotating in the X direction.

In addition, the liquid crystal layer 34 has a resonance structure that causes the above-described guided-mode resonance phenomenon (guided resonance) to occur. In other words, the liquid crystal layer 34 has a structure that can cause resonance of light in a specific wavelength range to occur. Accordingly, the liquid crystal layer 34 acts as a diffraction grating having a subwavelength grating of a subwavelength structure where the period Λ is shorter than a wavelength of light to be selectively reflected.

Further, as shown in FIG. 1, in the liquid crystal layer 34, the liquid crystal compound 40 is twisted and aligned in the thickness direction, that is, the Z direction. In other words, the liquid crystal layer 34 has a structure where the liquid crystal compound 40 is helically turned and laminated in the thickness direction.

By including the liquid crystal layer 34, in the optical element 10 according to the embodiment of the present invention that causes a guided-mode resonance phenomenon to occur using a liquid crystal diffraction element to selectively reflect light in a specific wavelength range, the reflection wavelength range can be widened and the controllability of the width of the reflection wavelength range can also be improved.

Figure 5:
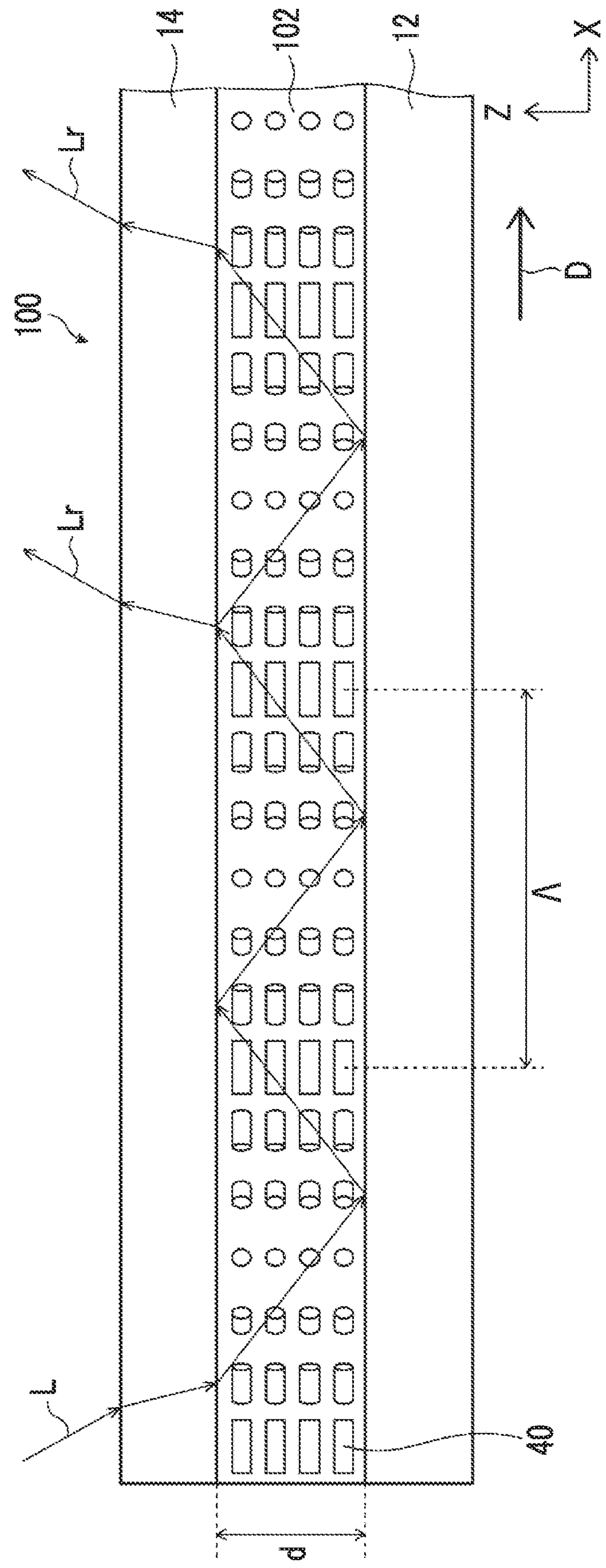
FIG. 5 is a diagram conceptually showing an example of an optical element in the related art.

Hereinafter, the guided-mode resonance phenomenon will be described using FIG. 5. FIG. 5 conceptually shows the liquid crystal diffraction element that causes the guided-mode resonance phenomenon to occur as described in Zhiyong Yang et al., Polarization independent guided-mode resonance in liquid crystal-based polarization gratings, Vol. 3, No. 11/15 November 2020, OSA Continuum, pp. 3107-3115.

An optical element 100 shown in FIG. 5 has the same configuration as the optical element 10 according to the embodiment of the present invention, except that the liquid crystal compound 40 in a liquid crystal layer 102 is not twisted and aligned in the thickness direction (Z direction).

Accordingly, even the liquid crystal layer 102 also has the liquid crystal alignment pattern where the optical axis 40A of the liquid crystal compound 40 continuously rotates in the X direction. In addition, the single period of the liquid crystal alignment pattern, that is, the period Λ of the periodic structure of the liquid crystal diffraction element is the length over which the optical axis 40A rotates by 180° in the X direction, and the liquid crystal layer 102 acts as a diffraction grating having a subwavelength grating where the period Λ is shorter than a wavelength of light to be selectively reflected.

Regarding the guided-mode resonance phenomenon described below, basically, the same can also be applied to the optical element 10 (liquid crystal layer 34) according to the embodiment of the present invention where the liquid crystal compound 40 is twisted and aligned in the thickness direction.

That is, the following description is the same as that of the optical element 10 according to the embodiment of the present invention, except that the optical element 100 is replaced with the optical element 10 and the liquid crystal layer 102 is replaced with the liquid crystal layer 34.

As illustrated in FIG. 5, in a case where the light L is incident into the optical element 100, first, the light is refracted by the second sheet 14, is incident into the liquid crystal layer 102, and is diffracted.

The light L incident into the liquid crystal layer 102 is diffracted such that emission of diffracted light to the incidence side, that is, the second sheet 14 side in the example shown in the drawing is suppressed. In addition, the light L incident into the liquid crystal layer 102 is guided in the liquid crystal layer 102 while being repeatedly totally reflected due to a difference in refractive index between the liquid crystal layer 102 and each of the first sheet 12 and the second sheet 14 and the like.

Here, by guiding the light in the specific wavelength range in the light to be guided, the guided-mode resonance phenomenon where the guiding of the light and the period Λ of the liquid crystal layer 102 as the subwavelength grating resonate with each other occurs.

As a result, as shown in FIG. 5, the light in the specific wavelength range is emitted from the liquid crystal layer 102 while being guided, and is emitted as strong reflected light Lr from the optical element 100.

Specifically, an angle of diffraction in the diffraction element varies depending on the wavelength of the light.

Therefore, the light in the specific wavelength range is diffracted by the liquid crystal layer 102 such that the guiding of the light and the period Λ resonate with each other due to a relationship between a thickness d of the liquid crystal layer 102 and the period Λ of the liquid crystal layer 102 as the subwavelength grating corresponding to the angle of diffraction. Due to this resonance, the light in the specific wavelength range is amplified while being guided, and is emitted as the strong reflected light Lr from the liquid crystal layer 102, that is, the optical element 100.

For example, in a case where white light is incident as the light L, for example, light in a wavelength range of a part of red light, light in a wavelength range of a part of green light, or light in a wavelength range of a part of blue light is emitted as the strong reflected light Lr from the optical element 100.

That is, the liquid crystal layer 102 has a resonance structure corresponding to the wavelength of the light and the relationship between the thickness d of the liquid crystal layer and the period Λ of the liquid crystal layer 102 as the subwavelength grating.

In other words, the liquid crystal layer 102 has the structure that causes resonance (guided-mode resonance phenomenon) to occur between the light to be guided and the period Λ of the subwavelength grating according to the wavelength of the light and the relationship between the thickness d of the liquid crystal layer and the period Λ of the liquid crystal layer 102.

The emission of the reflected light Lr is the same as specular reflection, except that an incidence position and an emission position of the light L are different from each other. That is, in a case where the incidence angle of the light L is +θ°, the emission angle of the reflected light Lr is −θ°.

Light other than the light in the specific wavelength range emitted as the reflected light Lr exits to the side opposite to the reflected light Lr such that the light is not guided in the liquid crystal layer 102 or transmits through the optical element 100 (liquid crystal layer 102) while being guided in the liquid crystal layer 102.

Here, in the optical element 10 according to the embodiment of the present invention, in the liquid crystal layer 34 having the resonance structure that causes the guided-mode resonance phenomenon to occur, the liquid crystal compound 40 is twisted and aligned in the thickness direction.

With the above-described configuration, in the optical element 10 according to the embodiment of the present invention that includes the liquid crystal layer 34 having the resonance structure and causes the guided-mode resonance phenomenon to occur using the liquid crystal diffraction element to selectively reflect light in the specific wavelength range, the selective reflection wavelength range can be widened and the controllability of the width of the reflection wavelength range can also be improved.

Figure 4:
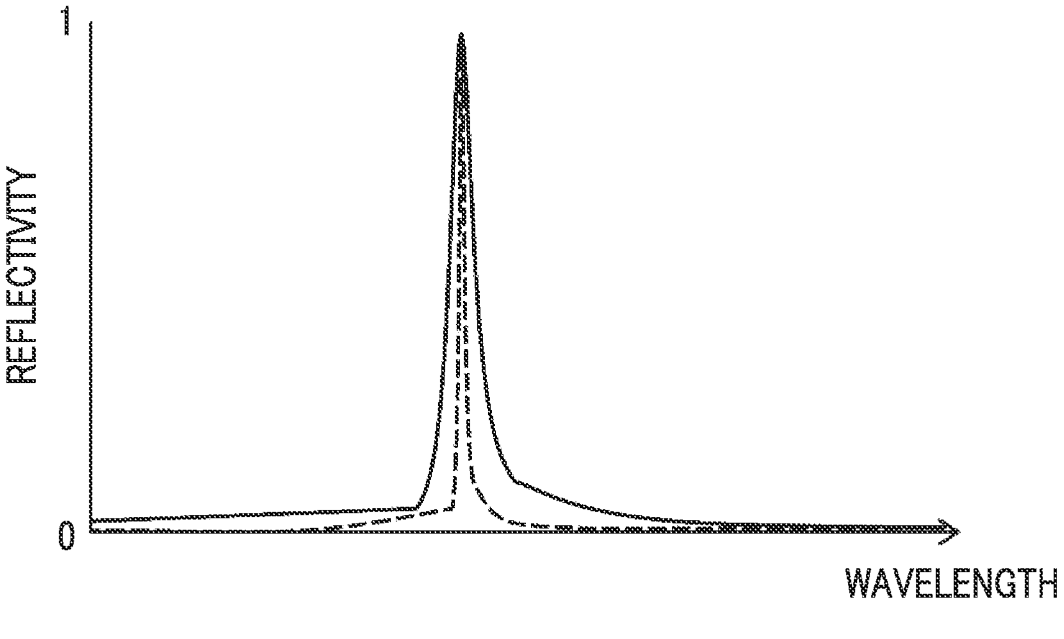
FIG. 4 is a graph showing wavelength-selective reflection of the optical element according to the present invention.

In the optical element in the related art where the liquid crystal compound 40 is not twisted and aligned in the thickness direction as described in Zhiyong Yang et al., Polarization independent guided-mode resonance in liquid crystal-based polarization gratings, Vol. 3, No. 11/15 November 2020, OSA Continuum, pp. 3107-3115, that is, as shown in FIG. 5, the wavelength range of the reflected light Lr, that is, the full width at half maximum is extremely narrow as indicated by a broken line in FIG. 4. In FIG. 4, the reflectivity is normalized with respect to a maximum value that is 1.

Therefore, the reflected light Lr has a problem in that it has low light energy and is difficult to detect. In addition, in the optical element in the related art where the liquid crystal compound 40 is not twisted and aligned in the thickness direction as shown in FIG. 5, it is difficult to adjust the width of the selective reflection wavelength range.

Here, according to an investigation by the present inventors, in a case where the light L is incident into the liquid crystal layer having the resonance structure from an oblique direction, a guiding direction of the guided-mode resonance phenomenon deviates toward one direction unlike incidence of front light. That is, in this case, the guiding direction of the light L is asymmetrical.

The present inventors found that the wavelength selectivity of reflection changes by tilting the periodic structure of the alignment of the liquid crystal compound of the liquid crystal layer 34, that is, the liquid crystal diffraction element according to the asymmetrical direction. That is, it was found that the liquid crystal compound 40 is twisted and aligned in the thickness direction to give a twisted structure such that the wavelength selectivity of reflection changes.

Specifically, it was found that, in the liquid crystal layer 34 having the resonance structure, the liquid crystal compound 40 is twisted and aligned in the thickness direction such that the wavelength range of light to be selectively reflected, that is, the full width at half maximum can be widened as indicated by a solid line in FIG. 4. Further, it was also found that, by adjusting the twisted angle in the thickness direction, the width of the selective reflection wavelength range can be adjusted.

The present invention has been made by obtaining the above-describe finding, in which in the optical element that causes the guided-mode resonance phenomenon to occur using the liquid crystal diffraction element to selectively reflect light in the specific wavelength range, the liquid crystal compound of the liquid crystal layer is twisted and aligned in the thickness direction such that the selective reflection wavelength range is wide and the excellent controllability of the width of the reflection wavelength range can be implemented.

In other words, in the present invention, in the optical element including the liquid crystal layer having the resonance structure, the liquid crystal compound of the liquid crystal layer is twisted and aligned in the thickness direction such that the selective reflection wavelength range is wide, and the excellent controllability of the width of the reflection wavelength range can be implemented.

In the optical element according to the embodiment of the present invention, the twisted angle of the liquid crystal compound 40 in the thickness direction in the liquid crystal layer 34 is not particularly limited. Basically, as the twisted angle of the liquid crystal compound 40 increases, the selective reflection wavelength range (full width at half maximum) can be widened.

In the liquid crystal layer 34, the twisted angle of the liquid crystal compound 40 in the thickness direction is preferably 10° to 120° and more preferably 10° to 90°.

By adjusting the twisted angle to be 10° or more, the expansion effect of the selective reflection wavelength range can be suitably obtained. In addition, according to an investigation by the present inventors, even in a case where the twisted angle of the liquid crystal compound 40 is 120° or more, the expansion effect of the selective reflection wavelength range is small, and the wavelength selectivity of reflected light may decrease.

The twisted angle of the liquid crystal compound 40 in the liquid crystal layer 34 can be adjusted depending on the kind of a chiral agent to be added to the liquid crystal composition and the addition amount thereof described below.

In addition, a twisted direction of the liquid crystal compound 40 in the liquid crystal layer 34 can be selected depending on the kind of the liquid crystal compound to be added to the liquid crystal composition and/or the addition amount of the chiral agent and the like described below.

In the present invention, the twisted direction (helical turning direction) of the liquid crystal compound 40 in the liquid crystal layer 34 is not particularly limited may be right-twisted or left-twisted.

In the optical element according to the embodiment of the present invention, the period Λ in the liquid crystal layer 34, that is, the subwavelength grating is not particularly limited and is less than the wavelength of light to be selectively reflected. More specifically, the period Λ of the liquid crystal layer 34 is small to the extent that a diffracted wave is not generated in a layer outside the liquid crystal layer 34, and is large to the extent that a first-order diffracted wave is generated in the liquid crystal layer 34 having a higher refractive index than the outside layer. In addition, the period Λ where the resonance structure that causes the guided-mode resonance phenomenon to occur can be formed may be appropriately set depending on the wavelength range of light to be selectively reflected, the thickness of the liquid crystal layer 34, and the like. The period Λ of the liquid crystal layer 34 is preferably 0.1 to 100 μm and more preferably 0.1 to 10 μm.

In addition, the thickness d of the liquid crystal layer 34 is not particularly limited, and the thickness d where the resonance structure that causes the guided-mode resonance phenomenon to occur can be formed may be appropriately set depending on the wavelength range of light to be selectively reflected, the period Λ of the liquid crystal layer 34, and the like. The thickness of the liquid crystal layer 34 is preferably 0.1 to 100 μm and more preferably 0.1 to 10 μm. The thickness d is determined depending on the value of the wavelength to be reflected, and as the wavelength increases, the thickness d increases. In a case where an incidence angle of light source light increases, an optical path length increases. Therefore, in general, the thickness d is set to be small accordingly.

In addition, as described above, the first sheet 12 and the second sheet 14 between which the liquid crystal layer 34 is sandwiched also has a lower refractive index than the liquid crystal layer.

The refractive index of the first sheet 12 and the second sheet 14 may be lower than the liquid crystal layer 34. A difference in refractive index between each of the first sheet 12 and the second sheet 14 and the liquid crystal layer 34 is not particularly limited and is preferably 0.05 to 1 and more preferably 0.05 to 0.7.

In addition, an alignment film that aligns liquid crystal may be provided between the liquid crystal layer 34 and the first sheet or the second sheet.

The film thickness, the refractive index, and the like of the alignment film are not particularly limited, but the film thickness is desirably small to the extent that the resonance phenomenon does not deteriorate. In addition, the refractive index of the alignment film is desirably close to that of any one of the liquid crystal layer, the first sheet, or the second sheet. Further, the film thickness and the refractive index of the alignment film can be appropriately set depending on the wavelength range of light to be selectively reflected, the thickness of the liquid crystal layer 34, and the like. The thickness of the alignment film is preferably 0.005 to 0.2 μm, more preferably 0.01 to 0.15 μm, and still more preferably 0.02 to 0.1 μm.

In addition, in an aspect where the alignment film is not used, the liquid crystal layer may be configured to be transferred to the first sheet or the second sheet. Further, the first sheet and the second sheet may be in any state of solid, liquid, or gas.

In the optical element according to the embodiment of the present invention, the liquid crystal layer may be a cholesteric liquid crystal layer obtained by immobilizing a cholesteric liquid crystalline phase.

As is well known, the cholesteric liquid crystalline phase has a helical structure in which the liquid crystal compound 40 is twisted and aligned and laminated in the thickness direction. In the helical structure, a configuration in which the liquid crystal compound 40 is helically rotated once (rotated by 360) is set as one helical pitch (pitch P), and plural pitches of the helically turned liquid crystal compounds 40 are laminated.

In the present invention, specifically, the cholesteric liquid crystalline phase refers to a phase where the twisted angle of the liquid crystal compound 40 in the liquid crystal layer is 360° or more.

As is well known, the cholesteric liquid crystalline phase exhibits selective reflectivity with respect to any of left circularly polarized light or right circularly polarized light at a specific wavelength depending on the pitch P and the helical twisted direction of the liquid crystal compound 40. Specifically, as the helical pitch P increases, the wavelength of light to be selectively reflected increases. In addition, in a case where the helical twisted direction of the liquid crystal compound 40 is right, right circularly polarized light is selectively reflected, and in a case where the helical twisted direction of the liquid crystal compound 40 is left, left circularly polarized light is selectively reflected. In addition, the cholesteric liquid crystalline phase allows transmission of light other than the light to be selectively reflected.

The liquid crystal layer 34 can be formed by immobilizing a liquid crystal phase in a layer shape, the liquid crystal phase obtained by aligning the liquid crystal compound in a predetermined alignment state.

The structure in which a liquid crystal phase is immobilized may be a structure in which the alignment of the liquid crystal compound as a liquid crystal phase is maintained. Typically, it is preferable that the structure in which a predetermined liquid crystal phase is immobilized is a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer 34 include a liquid crystal composition including a liquid crystal compound. It is preferable that the liquid crystal compound is a polymerizable liquid crystal compound.

In addition, the liquid crystal composition used for forming the liquid crystal layer 34 may further include a surfactant and a chiral agent.

Polymerizable Liquid Crystal Compound

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994- 16616A (JP-H6- 16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound disclosed in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer disclosed in JP1997-

133810A (JP-H9-133810A), and a liquid crystal polymer disclosed in JP1999-293252A (JP-H11-293252A) can be used.

Disk-Like Liquid Crystal Compound

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

Surfactant

The liquid crystal composition used for forming the liquid crystal layer may include a surfactant.

It is preferable that the surfactant is a compound that can function as an alignment control agent contributing to the stable or rapid alignment of the liquid crystal compound 40 in the liquid crystal layer 34. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

Chiral Agent (Optically Active Compound)

The chiral agent has a function of inducing the twisted alignment of the liquid crystal compound 40 in the thickness direction. The chiral agent may be selected depending on the purpose because a twisted direction or a twisted angle derived from the compound varies.

The chiral agent is not particularly limited. For example, a well-known compound, an isosorbide, or an isomannide derivative can be used. Examples of the well-known compound include compounds described in "Liquid Crystal Device Handbook (No. 142 Committee of Japan Society for the Promotion of Science, 1989), Chapter 3, Article 4-3, chiral agent for twisted nematic (TN) or super twisted nematic (STN), p. 199".

In general, the chiral agent includes a chiral carbon atom. However, an axially chiral compound or a planar chiral compound not having a chiral carbon atom can also be used as the chiral agent. Examples of the axially chiral compound or the planar chiral compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photo mask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

As described above, in the liquid crystal layer 34, the twisted angle of the liquid crystal compound 40 in the thickness direction can be adjusted based on the amount of the chiral agent.

Accordingly, the content of the chiral agent in the liquid crystal composition may be appropriately set depending on the desired twisted angle of the liquid crystal compound 40 in the thickness direction.

Polymerization Initiator

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator to be used is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in US4212970A).

The content of the photopolymerization initiator in the liquid crystal composition is preferably 0.1 to 20 mass % and more preferably 0.5 to 12 mass % with respect to the content of the liquid crystal compound.

Crosslinking Agent

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. The crosslinking agents may be used alone or in combination of two or more kinds.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

Other Additives

Optionally, a polymerization inhibitor, an antioxidant, an ultraviolet absorber, a light stabilizer, a coloring material, metal oxide fine particles, or the like can be further added to the liquid crystal composition in a range where optical performance and the like do not deteriorate.

In a case where the liquid crystal layer 34 is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. The organic solvents may be used alone or in combination of two or more kinds. Among these, a ketone is preferable in consideration of an environmental burden.

In a case where the liquid crystal layer 34 is formed, it is preferable that the liquid crystal layer 34 is formed by applying the liquid crystal composition to a surface where the liquid crystal layer 34 is to be formed, aligning the liquid crystal composition to a state of a desired liquid crystalline phase, and curing the liquid crystal compound 40.

That is, in a case where the liquid crystal layer 34 is formed on the above-described alignment film, it is preferable that the liquid crystal layer 34 is formed by applying the liquid crystal composition to the alignment film, twisting and aligning the liquid crystal compound, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the liquid crystal layer. In the drying and/or heating step, the liquid crystal compound 40 in the liquid crystal composition may be twisted and aligned. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 $mJ/cm^2$ to 50 $J/cm^2$ and more preferably 50 to 1500 $mJ/cm^2$. In order to promote a photopolymerization reaction, light irradiation may be performed under heating conditions or in a nitrogen atmosphere. The wavelength of irradiated ultraviolet light is preferably 250 to 430 nm.

The optical sensor according to the embodiment of the present invention is an optical sensor including the above-described optical element according to the embodiment of the present invention.

The selective reflection wavelength range of the optical element according to the embodiment of the present invention is sensitive to a change in refractive index around the liquid crystal diffraction element, that is, the liquid crystal layer. Therefore, the optical sensor according to the embodiment of the present invention can be suitably used as a refractive index sensor.

In a case where the optical sensor according to the embodiment of the present invention is used as a refractive index sensor, an object to be measured for which a refractive index is to be investigated is disposed on the liquid crystal layer in the optical element according to the embodiment of the present invention.

Depending on the refractive index of the object to be measured, the position of a peak wavelength of reflected light from the optical sensor according to the embodiment of the present invention is shifted. Accordingly, a relationship between the refractive index of a material disposed on the liquid crystal layer and the position of the peak wavelength of the reflected light is grasped in advance, the object to be measured of which the refractive index is not known is disposed on the liquid crystal layer, and the position of the peak wavelength of the reflected light is measured. As a result, the refractive index of the object to be measured can be acquired.

In particular, as the average refractive index of the liquid crystal layer and the refractive index of the object to be measured are closer to each other, the shift width of the peak wavelength of the reflected light increases. Therefore, as the refractive index of the object to be measured is closer to the average refractive index of the liquid crystal layer, the refractive index of the object to be measured can be accurately acquired with high sensitivity. In a case where a difference in refractive index between the average refractive index of the liquid crystal layer and the refractive index of the object to be measured is 0.05 to 0.3, the refractive index of the object to be measured can be more accurately acquired with high sensitivity.

The average refractive index of the liquid crystal layer refers to the average value of a refractive index in a direction where a refractive index in the in-plane direction of the liquid crystal layer is the highest and a refractive index in a direction orthogonal to the direction in which the refractive index is the highest.

In addition, a material having a predetermined refractive index is disposed on the liquid crystal layer and an incidence angle of incidence light changes, reflected light is detected at a specific incidence angle. Depending on the refractive index of the object to be measured, an angle at which reflected light from the optical sensor according to the embodiment of the present invention reaches the peak is shifted. Using the above-described characteristics, a relationship between the refractive index of a material disposed on the liquid crystal layer and the incidence angle at which the reflected light is detected is grasped in advance, the object to be measured of which the refractive index is not known is disposed on the liquid crystal layer, and an incidence angle at which reflected light is obtained is measured. As a result, the refractive index of the object to be measured can be acquired.

In addition, the optical sensor according to the embodiment of the present invention can also be suitably used as a biochemical sensor or the like.

Further, in addition to the optical sensor, the optical element according to the embodiment of the present invention can also be suitably used as a wavelength selective filter, a polarization separating element, a retardation plate, an optical switch, or the like.

Hereinabove, the optical element and the optical sensor according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples.

Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

Preparation of Liquid Crystal Layer (Formation of Alignment Film)

As a support substrate, a glass substrate (EAGLE, manufactured by Corning Inc.) was prepared. The following coating liquid for forming an alignment film was applied to the support substrate by spin coating. The support substrate on which the coating film of the coating liquid for forming an alignment film was formed was dried using a hot plate at 60° C. for 60 seconds. As a result, an alignment film P-2 was formed.

| Coating Liquid for forming Alignment Film |
|---|
| Material for photo-alignment . . . 1.00 part by mass |
| Water . . . 16.00 parts by mass |
| Butoxyethanol . . . 42.00 parts by mass |
| Propylene glycol monomethyl ether . . . 42.00 parts by mass |

Material for Photo-Alignment

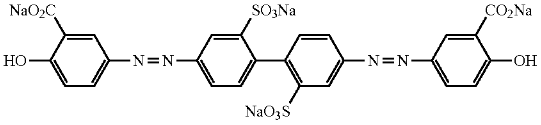

(Exposure of Alignment Film)

By irradiating the obtained alignment film P-2 with polarized ultraviolet light (50 mJ/$cm^2$, using an ultra-high pressure mercury lamp), the alignment film P-2 was exposed.

The alignment film was exposed using the exposure device shown in FIG. 3 to form the alignment film P-2 having an alignment pattern. In the exposure device, a laser that emits laser light having a wavelength of 325 nm was used as the laser. The exposure amount of the interference light was 300 mJ/$cm^2$. An intersecting angle (intersecting angle $\alpha$) between the two beams was adjusted such that the single period $\Lambda$ (the length over which the optical axis rotates by 180°) of an alignment pattern formed by interference of two laser beams was 0.4 μm.

(Formation of Liquid Crystal Layer)

As the liquid crystal composition forming the liquid crystal layer, the following composition B-1 was prepared.

| Composition B-1 |
|---|
| Rod-like liquid crystal compound L-1 . . . 100.00 parts by mass |
| Polymerization initiator (IRGACURE (registered trade name) 907, manufactured by BASF SE) . . . 3.00 parts by mass |
| Photosensitizer (KAYACURE DETX-S, manufactured by Nippon Kayaku Co., Ltd.) . . . 1.00 part by mass |
| Leveling agent T-1 . . . 0.08 parts by mass |
| Methyl ethyl ketone . . . 2000.00 parts by mass |

Rod-like liquid crystal compound L-1 (including the following structures at a mass ratio shown on the right side)

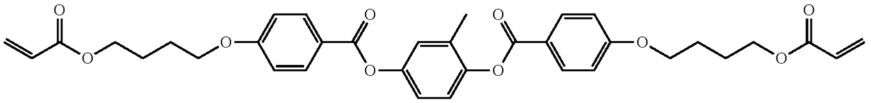

84%

-continued

Composition B-1

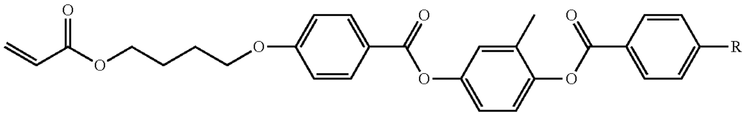

14%

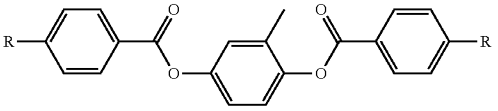

2%

R:

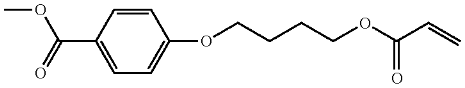

Leveling Agent T-1

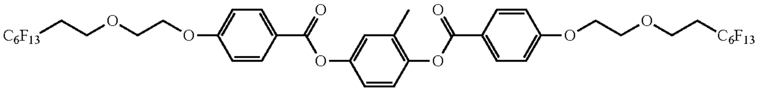

The liquid crystal layer was formed by applying multiple layers of the composition B-1 to the alignment film P-2.

The application of the multiple layers refers to a method of repeating the following processes including: preparing a first liquid crystal immobilized layer by applying the first layer-forming composition B-1 to the alignment film, heating the composition B-1, cooling the composition B-1, and irradiating the composition B-1 with ultraviolet light for curing; and preparing a second or subsequent liquid crystal immobilized layer by applying the second or subsequent layer-forming composition B-1 to the formed liquid crystal immobilized layer, heating the composition B-1, cooling the composition B-1, and irradiating the composition B-1 with ultraviolet light for curing as described above.

Regarding the first liquid crystal layer, the following composition B -1 was applied to the alignment film P-2 to form a coating film, the coating film was heated using a hot plate at 80° C., and the coating film was irradiated with ultraviolet light having a wavelength of 365 nm at an irradiation dose of 300 mJ/cm$^2$ using a high pressure mercury lamp in a nitrogen atmosphere at 80° C. As a result, the alignment of the liquid crystal compound was immobilized.

Regarding the second or subsequent liquid crystal immobilized layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired film thickness, and the liquid crystal layer was formed.

A difference Δn in refractive index of the cured layer of a liquid crystal composition B-1 was obtained by applying the liquid crystal composition B-1 a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer, and measuring the retardation Re(λ) and the film thickness of the liquid crystal immobilized layer. $\Delta n_{\lambda}$ can be calculated by dividing the retardation Re(λ) by the film thickness.

The retardation Re(λ) was measured by measuring a desired wavelength using Axoscan (manufactured by Axometrix inc.) and measuring the film thickness using a SEM. In addition, a refractive index ne (λ) with respect to extraordinary light and a refractive index no (λ) with respect to ordinary light were measured using an Abbe refractometer. The refractive index anisotropy Δn (λ) was obtained from a difference between ne(λ) and no(λ). In the representations Re(λ), ne(λ), no(λ), and Δn(λ), λ represents the wavelength of incidence light. In the following description, the wavelength λ of incidence light was 633 nm.

Regarding the liquid crystal layer, the final film thickness was 1.68 μm, $\Delta n_{633}$×thickness=Re(633) was 254.9 nm, ne(633) was 1.6944, no(633) was 1.5427, Δn(633) was 0.1517, and it was verified with a microscope that the liquid crystal layer was periodically aligned. In addition, the twisted angle of the liquid crystal compound in the liquid crystal layer in the thickness direction was 0°.

Further, in a cross sectional image with a SEM, bright and dark lines that were perpendicular to the lower interface (interface with the glass substrate) of the liquid crystal layer were observed. The bright and dark lines were observed with the configuration where the liquid crystal compounds aligned in the same direction were laminated in the thickness direction.

A certified reflective index liquid (refractive index: 1.510, manufactured by Cargille Lab) was applied to the liquid crystal layer, and the layer thereof was laminated on the glass substrate of the cover substrate such that air bubbles does not enter the layer. The thickness of the layer of the certified reflective index liquid was 100 μm.

This way, an optical element was prepared.

[Evaluation]

The wavelength dependence of the reflectivity of the prepared optical element was measured.

On the support substrate side of the optical element, laser light was incident from the normal direction of the main surface of the optical element, and the reflected light thereof was measured. A light source, a spectrophotometer, and a detector were Libra (manufactured by Coherent Corp.), iHR-320 (manufactured by HORIBA Jobin-Yvon), and Newton-Em (manufactured by Andor), respectively. The measurement wavelength was in a range of 580 to 680 nm.

As a result of the measurement, a sharp reflected light peak where a guided-mode resonance phenomenon was shown was observed. The peak wavelength was 607 nm. In addition, the reflection wavelength bandwidth was 0.5 nm.

Example 1

An optical element was prepared using the same method as that of the formation of the liquid crystal layer in Comparative Example 1, except that the composition B-1 was changed to the following composition B-2.

| Composition B-2 |
| --- |
| Rod-like liquid crystal compound L-1 . . . 100.00 parts by mass |
| Chiral agent Ch-A . . . 0.035 parts by mass |
| Polymerization initiator (IRGACURE (registered trade name) 907, manufactured by BASF SE) . . . 3.00 parts by mass |
| Photosensitizer (KAYACURE DETX-S, manufactured by Nippon Kayaku Co., Ltd.) . . . 1.00 part by mass |
| Leveling agent T-1 . . . 0.08 parts by mass |
| Methyl ethyl ketone . . . 2000.00 parts by mass |

Chiral agent Ch-A

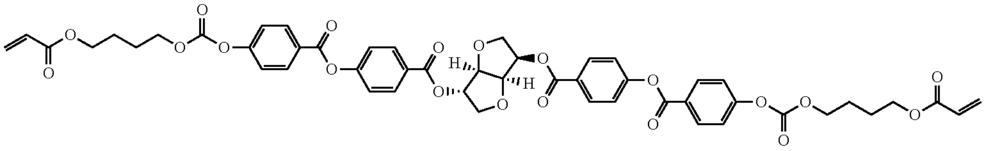 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

In a case where the liquid crystal layer was verified using the same method as that of Comparative Example 1, the final film thickness was 1.68 μm, $\Delta n_{633}$×thickness=Re(633) was 254.9 nm, ne(633) was 1.6944, no(633) was 1.5427, Δn(633) was 0.1517, and the liquid crystal layer was periodically aligned. In addition, the twisted angle of the liquid crystal compound in the liquid crystal layer in the thickness direction was 10°.

Further, in a cross sectional image with a SEM, bright and dark lines corresponding to the twisted angle of the liquid crystal compound that were oblique to the lower interface (interface with the glass substrate) of the liquid crystal layer were observed.

[Evaluation]

Using the same method as that of Comparative Example 1, the wavelength dependence of the reflectivity of the prepared optical element was measured.

As a result of the measurement, a sharp reflected light peak (peak wavelength: 607 nm) where a guided-mode resonance phenomenon was shown was observed. In this case, the reflection wavelength bandwidth was 0.8 nm.

That is, it can be seen that the optical element according to the embodiment of the present invention functions as an optical element having a wide reflection wavelength bandwidth as compared to Comparative Example.

Example 2

An optical element was prepared using the same method as that of the formation of the liquid crystal layer in Example 1, except that the amount of the chiral agent Ch-A of the composition B-2 was changed to 0.16 parts by mass.

In a case where the liquid crystal layer was verified using the same method as that of Comparative Example 1, the final film thickness was 1.68 μm, $\Delta n_{633}$×thickness=Re(633) was 254.9 nm, ne(633) was 1.6944, no(633) was 1.5427, Δn(633) was 0.1517, and the liquid crystal layer was periodically aligned. In addition, the twisted angle of the liquid crystal compound in the liquid crystal layer in the thickness direction was 45°.

Further, in a cross sectional image with a SEM, bright and dark lines corresponding to the twisted angle of the liquid crystal compound that were oblique to the lower interface (interface with the glass substrate) of the liquid crystal layer were observed.

[Evaluation]

Using the same method as that of Comparative Example 1, the wavelength dependence of the reflectivity of the prepared optical element was measured.

As a result of the measurement, a sharp reflected light peak (peak wavelength: 607 nm) where a guided-mode resonance phenomenon was shown was observed. In this case, the reflection wavelength bandwidth was 1.7 nm.

That is, it can be seen that the optical element according to the embodiment of the present invention functions as an optical element having a wide reflection wavelength bandwidth as compared to Comparative Example.

Example 3

An optical element was prepared using the same method as that of the formation of the liquid crystal layer in Example 1, except that the amount of the chiral agent Ch-A of the composition B-2 was changed to 0.25 parts by mass.

In a case where the liquid crystal layer was verified using the same method as that of Comparative Example 1, the final film thickness was 1.68 μm, $\Delta n_{633}$×thickness=Re(633) was 254.9 nm, ne(633) was 1.6944, no(633) was 1.5427, Δn(633) was 0.1517, and the liquid crystal layer was periodically aligned. In addition, the twisted angle of the liquid crystal compound in the liquid crystal layer in the thickness direction was 70°.

Further, in a cross sectional image with a SEM, bright and dark lines corresponding to the twisted angle of the liquid crystal compound that were oblique to the lower interface (interface with the glass substrate) of the liquid crystal layer were observed.

[Evaluation]

Using the same method as that of Comparative Example 1, the wavelength dependence of the reflectivity of the prepared optical element was measured.

As a result of the measurement, a sharp reflected light peak (peak wavelength: 607 nm) where a guided-mode resonance phenomenon was shown was observed. In this case, the reflection wavelength bandwidth was 2.7 nm.

That is, it can be seen that the optical element according to the embodiment of the present invention functions as an optical element having a wide reflection wavelength bandwidth as compared to Comparative Example.

Example 4

An optical element was prepared using the same method as that of the formation of the liquid crystal layer in Example 1, except that the amount of the chiral agent Ch-A of the composition B-2 was changed to 0.32 parts by mass.

In a case where the liquid crystal layer was verified using the same method as that of Comparative Example 1, the final film thickness was 1.68 μm, $\Delta n_{633}$×thickness=Re(633) was 254.9 nm, ne(633) was 1.6944, no(633) was 1.5427, Δn(633) was 0.1517, and the liquid crystal layer was periodically aligned. In addition, the twisted angle of the liquid crystal compound in the liquid crystal layer in the thickness direction was 90°.

Further, in a cross sectional image with a SEM, bright and dark lines corresponding to the twisted angle of the liquid crystal compound that were oblique to the lower interface (interface with the glass substrate) of the liquid crystal layer were observed.

[Evaluation]

Using the same method as that of Comparative Example 1, the wavelength dependence of the reflectivity of the prepared optical element was measured.

As a result of the measurement, a sharp reflected light peak (peak wavelength: 607 nm) where a guided-mode resonance phenomenon was shown was observed. In this case, the reflection wavelength bandwidth was 3 nm.

That is, it can be seen that the optical element according to the embodiment of the present invention functions as an optical element having a wide reflection wavelength bandwidth as compared to Comparative Example.

Example 5

An optical element was prepared using the same method as that of the formation of the liquid crystal layer in Example 1, except that the amount of the chiral agent Ch-A of the composition B-2 was changed to 0.39 parts by mass.

In a case where the liquid crystal layer was verified using the same method as that of Comparative Example 1, the final film thickness was 1.68 μm, $\Delta n_{633}$×thickness=Re(633) was 254.9 nm, ne(633) was 1.6944, no(633) was 1.5427, Δn(633) was 0.1517, and the liquid crystal layer was periodically aligned. In addition, the twisted angle of the liquid crystal compound in the liquid crystal layer in the thickness direction was 110°.

Further, in a cross sectional image with a SEM, bright and dark lines corresponding to the twisted angle of the liquid crystal compound that were oblique to the lower interface (interface with the glass substrate) of the liquid crystal layer were observed.

[Evaluation]

Using the same method as that of Comparative Example 1, the wavelength dependence of the reflectivity of the prepared optical element was measured.

As a result of the measurement, a sharp reflected light peak (peak wavelength: 607 nm) where a guided-mode resonance phenomenon was shown was observed. In this case, the reflection wavelength bandwidth was 2.8 nm.

That is, it can be seen that the optical element according to the embodiment of the present invention functions as an optical element having a wide reflection wavelength bandwidth as compared to Comparative Example.

Example 6

An optical element was prepared using the same method as that of the formation of the liquid crystal layer in Example 1, except that the amount of the chiral agent Ch-A of the composition B-2 was changed to 0.43 parts by mass.

In a case where the liquid crystal layer was verified using the same method as that of Comparative Example 1, the final film thickness was 1.68 μm, $\Delta n_{633}$×thickness=Re(633) was 254.9 nm, ne(633) was 1.6944, no(633) was 1.5427, Δn(633) was 0.1517, and the liquid crystal layer was periodically aligned. In addition, the twisted angle of the liquid crystal compound in the liquid crystal layer in the thickness direction was 120°.

Further, in a cross sectional image with a SEM, bright and dark lines corresponding to the twisted angle of the liquid crystal compound that were oblique to the lower interface (interface with the glass substrate) of the liquid crystal layer were observed.

[Evaluation]

Using the same method as that of Comparative Example 1, the wavelength dependence of the reflectivity of the prepared optical element was measured.

As a result of the measurement, a sharp reflected light peak (peak wavelength: 607 nm) where a guided-mode resonance phenomenon was shown was observed. In this case, the reflection wavelength bandwidth was 1.1 nm.

That is, it can be seen that the optical element according to the embodiment of the present invention functions as an optical element having a wide reflection wavelength bandwidth as compared to Comparative Example.

Comparative Example 11

An optical element was prepared using the same method as that of the formation of the liquid crystal layer in Comparative Example 1, except that the composition B-1 was changed to the following composition B-3.

| Composition B-3 |
| --- |
| Rod-like liquid crystal compound L-1 . . . 10.00 parts by mass |
| Rod-like liquid crystal compound L-2 . . . 90.00 parts by mass |
| Polymerization initiator (IRGACURE OXE01, manufactured by BASF SE) . . . 1.00 part by mass |
| Leveling agent T-1 . . . 0.08 parts by mass |
| Methyl ethyl ketone . . . 4000.00 parts by mass |

Rod-like liquid crystal compound L-2

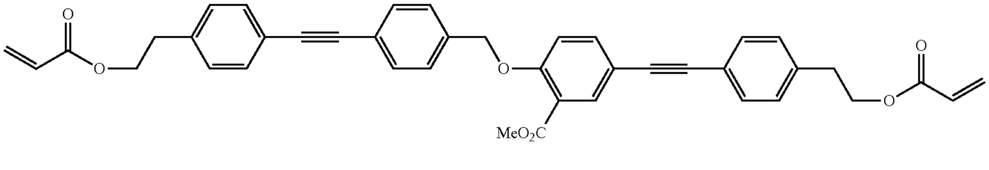 [SMILES: C=CC(=O)OCCc1ccc(C#Cc2ccc(COc3ccc(C#Cc4ccc(CCOC(=O)C=C)cc4)cc3C(=O)OC)cc2)cc1]

In a case where the liquid crystal layer was verified using the same method as that of Comparative Example 1, the final film thickness was 1.68 μm, $\Delta n_{633}$×thickness=Re(633) was 380.9 nm, ne(633) was 1.7913, no(633) was 1.5646, Δn(633) was 0.2267, and the liquid crystal layer was periodically aligned. In addition, the twisted angle of the liquid crystal compound in the liquid crystal layer in the thickness direction was 0°.

Further, in a cross sectional image with a SEM, bright and dark lines that were perpendicular to the lower interface (interface with the glass substrate) of the liquid crystal layer were observed.

[Evaluation]

Using the same method as that of Comparative Example 1, the wavelength dependence of the reflectivity of the optical element was measured.

As a result of the measurement, a sharp reflected light peak (peak wavelength: 605 nm) where a guided-mode resonance phenomenon was shown was observed. In this case, the reflection wavelength bandwidth was 2 nm.

Example 11

An optical element was prepared using the same method as that of the formation of the liquid crystal layer in Comparative Example 11, except that the composition B -3 was changed to the following composition B-4.

| Composition B-4 |
| --- |
| Rod-like liquid crystal compound L-1 . . . 10.00 parts by mass |
| Rod-like liquid crystal compound L-2 . . . 90.00 parts by mass |
| Polymerization initiator (IRGACURE OXE01, manufactured by BASF SE) . . . 1.00 part by mass |
| Chiral agent C-1 . . . 0.026 parts by mass |
| Leveling agent T-1 . . . 0.08 parts by mass |
| Methyl ethyl ketone . . . 4000.00 parts by mass |

Chiral Agent C-1

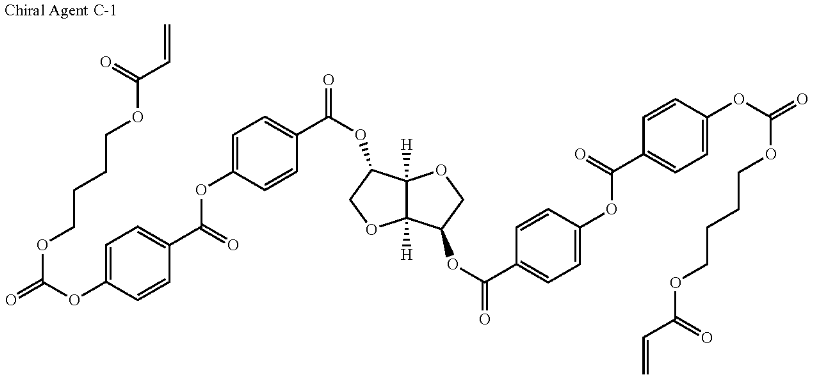

In a case where the liquid crystal layer was verified using the same method as that of Comparative Example 1, the final film thickness was 1.68 μm, $\Delta n_{633}$×thickness=Re(633) was 380.9 nm, ne(633) was 1.7913, no(633) was 1.5646, Δn(633) was 0.2267, and the liquid crystal layer was periodically aligned. In addition, the twisted angle of the liquid crystal compound in the liquid crystal layer in the thickness direction was 10°.

Further, in a cross sectional image with a SEM, bright and dark lines corresponding to the twisted angle of the liquid crystal compound that were oblique to the lower interface (interface with the glass substrate) of the liquid crystal layer were observed.

[Evaluation]

Using the same method as that of Comparative Example 1, the wavelength dependence of the reflectivity of the prepared optical element was measured.

As a result of the measurement, a sharp reflected light peak (peak wavelength: 605 nm) where a guided-mode resonance phenomenon was shown was observed. In this case, the reflection wavelength bandwidth was 2.2 nm.

That is, it can be seen that the optical element according to the embodiment of the present invention functions as an optical element having a wide reflection wavelength bandwidth as compared to Comparative Example.

Example 12

An optical element was prepared using the same method as that of the formation of the liquid crystal layer in Example 11, except that the amount of the chiral agent C-1 of the composition B-4 was changed to 0.12 parts by mass.

In a case where the liquid crystal layer was verified using the same method as that of Comparative Example 1, the final film thickness was 1.68 μm, $\Delta n_{633}$×thickness=Re(633) was 380.9 nm, ne(633) was 1.7913, no(633) was 1.5646, Δn(633) was 0.2267, and the liquid crystal layer was periodically aligned. In addition, the twisted angle of the liquid crystal compound in the liquid crystal layer in the thickness direction was 45°.

Further, in a cross sectional image with a SEM, bright and dark lines corresponding to the twisted angle of the liquid crystal compound that were oblique to the lower interface (interface with the glass substrate) of the liquid crystal layer were observed.

[Evaluation]

Using the same method as that of Comparative Example 1, the wavelength dependence of the reflectivity of the prepared optical element was measured.

As a result of the measurement, a sharp reflected light peak (peak wavelength: 605 nm) where a guided-mode resonance phenomenon was shown was observed. In this case, the reflection wavelength bandwidth was 4.7 nm.

That is, it can be seen that the optical element according to the embodiment of the present invention functions as an optical element having a wide reflection wavelength bandwidth as compared to Comparative Example.

Example 13

An optical element was prepared using the same method as that of the formation of the liquid crystal layer in Example 11, except that the amount of the chiral agent C-1 of the composition B-4 was changed to 0.18 parts by mass.

In a case where the liquid crystal layer was verified using the same method as that of Comparative Example 1, the final film thickness was 1.68 μm, $\Delta n_{633}$×thickness=Re(633) was 380.9 nm, ne(633) was 1.7913, no(633) was 1.5646, Δn(633) was 0.2267, and the liquid crystal layer was periodically aligned. In addition, the twisted angle of the liquid crystal compound in the liquid crystal layer in the thickness direction was 70°.

Further, in a cross sectional image with a SEM, bright and dark lines corresponding to the twisted angle of the liquid crystal compound that were oblique to the lower interface (interface with the glass substrate) of the liquid crystal layer were observed.

[Evaluation]

Using the same method as that of Comparative Example 1, the wavelength dependence of the reflectivity of the prepared optical element was measured.

As a result of the measurement, a sharp reflected light peak (peak wavelength: 605 nm) where a guided-mode resonance phenomenon was shown was observed. In this case, the reflection wavelength bandwidth was 3.9 nm.

That is, it can be seen that the optical element according to the embodiment of the present invention functions as an optical element having a wide reflection wavelength bandwidth as compared to Comparative Example.

Example 14

An optical element was prepared using the same method as that of the formation of the liquid crystal layer in Example 11, except that the amount of the chiral agent C-1 of the composition B-4 was changed to 0.23 parts by mass.

In a case where the liquid crystal layer was verified using the same method as that of Comparative Example 1, the final film thickness was 1.68 μm, $\Delta n_{633}$×thickness=Re(633) was 380.9 nm, ne(633) was 1.7913, no(633) was 1.5646, Δn(633) was 0.2267, and the liquid crystal layer was periodically aligned. In addition, the twisted angle of the liquid crystal compound in the liquid crystal layer in the thickness direction was 90°.

Further, in a cross sectional image with a SEM, bright and dark lines corresponding to the twisted angle of the liquid crystal compound that were oblique to the lower interface (interface with the glass substrate) of the liquid crystal layer were observed.

[Evaluation]

Using the same method as that of Comparative Example 1, the wavelength dependence of the reflectivity of the prepared optical element was measured.

As a result of the measurement, a sharp reflected light peak (peak wavelength: 605 nm) where a guided-mode resonance phenomenon was shown was observed. In this case, the reflection wavelength bandwidth was 2.8 nm.

That is, it can be seen that the optical element according to the embodiment of the present invention functions as an optical element having a wide reflection wavelength bandwidth as compared to Comparative Example.

Example 15

An optical element was prepared using the same method as that of the formation of the liquid crystal layer in Example 11, except that the amount of the chiral agent C-1 of the composition B-4 was changed to 0.28 parts by mass.

In a case where the liquid crystal layer was verified using the same method as that of Comparative Example 1, the final film thickness was 1.68 μm, $\Delta n_{633}$×thickness=Re(633) was 380.9 nm, ne(633) was 1.7913, no(633) was 1.5646, Δn(633) was 0.2267, and the liquid crystal layer was periodically aligned. In addition, the twisted angle of the liquid crystal compound in the liquid crystal layer in the thickness direction was 110°.

Further, in a cross sectional image with a SEM, bright and dark lines corresponding to the twisted angle of the liquid crystal compound that were oblique to the lower interface (interface with the glass substrate) of the liquid crystal layer were observed.

[Evaluation]

Using the same method as that of Comparative Example 1, the wavelength dependence of the reflectivity of the prepared optical element was measured.

As a result of the measurement, a sharp reflected light peak (peak wavelength: 605 nm) where a guided-mode resonance phenomenon was shown was observed. In this case, the reflection wavelength bandwidth was 2.8 nm.

That is, it can be seen that the optical element according to the embodiment of the present invention functions as an optical element having a wide reflection wavelength bandwidth as compared to Comparative Example.

Example 16

An optical element was prepared using the same method as that of the formation of the liquid crystal layer in Example 11, except that the amount of the chiral agent C-1 of the composition B-4 was changed to 0.31 parts by mass.

In a case where the liquid crystal layer was verified using the same method as that of Comparative Example 1, the final film thickness was 1.68 μm $\Delta n_{633}$×thickness=Re(633) was 380.9 nm, ne(633) was 1.7913, no(633) was 1.5646, Δn(633) was 0.2267, and the liquid crystal layer was periodically aligned. In addition, the twisted angle of the liquid crystal compound in the liquid crystal layer in the thickness direction was 120°.

Further, in a cross sectional image with a SEM, bright and dark lines corresponding to the twisted angle of the liquid crystal compound that were oblique to the lower interface (interface with the glass substrate) of the liquid crystal layer were observed.

[Evaluation]

Using the same method as that of Comparative Example 1, the wavelength dependence of the reflectivity of the prepared optical element was measured.

As a result of the measurement, a sharp reflected light peak (peak wavelength: 605 nm) where a guided-mode resonance phenomenon was shown was observed. In this case, the reflection wavelength bandwidth was 2.2 nm.

That is, it can be seen that the optical element according to the embodiment of the present invention functions as an optical element having a wide reflection wavelength bandwidth as compared to Comparative Example.

Example 31

An optical element was prepared using the same method as that of the preparation of the optical element in Example 4, except that the certified reflective index liquid was changed from Certified Reflective index liquids (refractive index: 1.510, manufactured by Cargille Lab) to Certified Reflective index liquids (refractive index: 1.490, manufactured by Cargille Lab).

[Evaluation]

Using the same method as that of Comparative Example 1, the wavelength dependence of the reflectivity of the prepared optical element according to Examples was measured.

As a result of the measurement, a sharp reflected light peak where a guided-mode resonance phenomenon was shown was observed, and the reflection wavelength bandwidth was 3 nm. In this case, the reflection peak wavelength was 606.2 nm, which was different from Example 4.

This result shows that the optical element according to the embodiment of the present invention can preferably detect a small change in refractive index of a layer near the liquid crystal layer from the wavelength of the reflection wavelength peak.

Example 32

An optical element was prepared using the same method as that of the preparation of the optical element in Example 4, except that the certified reflective index liquid was changed from Certified Reflective index liquids (refractive index: 1.510, manufactured by Cargille Lab) to Certified Reflective index liquids (refractive index: 1.500, manufactured by Cargille Lab).

[Evaluation]

Using the same method as that of Comparative Example 1, the wavelength dependence of the reflectivity of the prepared optical element was measured.

As a result of the measurement, a sharp reflected light peak where a guided-mode resonance phenomenon was shown was observed, and the reflection wavelength bandwidth was 3 nm. In this case, the reflection peak wavelength was 606.5 nm, which was different from Example 4.

This result shows that the optical element according to the embodiment of the present invention can preferably detect a small change in refractive index of a layer near the liquid crystal layer from the wavelength of the reflection wavelength peak.

Example 33

An optical element was prepared using the same method as that of the preparation of the optical element in Example 4, except that the certified reflective index liquid was changed from Certified Reflective index liquids (refractive index: 1.510, manufactured by Cargille Lab) to Certified Reflective index liquids (refractive index: 1.520, manufactured by Cargille Lab).

[Evaluation]

Using the same method as that of Comparative Example 1, the wavelength dependence of the reflectivity of the prepared optical element was measured.

As a result of the measurement, a sharp reflected light peak where a guided-mode resonance phenomenon was shown was observed, and the reflection wavelength bandwidth was 3 nm. In this case, the reflection peak wavelength was 608.2 nm, which was different from Example 4.

This result shows that the optical element according to the embodiment of the present invention can preferably detect a small change in refractive index of a layer near the liquid crystal layer from the wavelength of the reflection wavelength peak.

The results of Example 31, Example 32, Example 4, and Example 33 are collectively shown in the following table.

TABLE 1

| | Refractive Index of Certified Reflective Index Liquid | Reflection Peak Wavelength [nm] | Difference in Reflection Peak Wavelength [nm] |
|---|---|---|---|
| Example 31 | 1.490 | 606.2 | — |
| Example 32 | 1.500 | 606.5 | 0.3 |
| Example 4 | 1.510 | 607 | 0.5 |
| Example 33 | 1.520 | 608.2 | 1.2 |
| | | | — |

The refractive index of the liquid crystal layer used in Examples is 1.61855, which was the average value of ne(633) of 1.6944 and no(633) of 1.5427.

The result shows that, as the refractive index of the liquid crystal layer and the refractive index of the layer near the liquid crystal layer (the refractive index of the layer of the certified reflective index liquid) are closer to each other, a change in reflection peak with respect to a change in refractive index of the layer near the liquid crystal layer is large, and a small change in refractive index can be detected with high sensitivity.

The present invention can be suitably used for a wavelength selective filter, an optical sensor, or the like.

EXPLANATION OF REFERENCES

10, 100: optical element
12: first sheet
14: second sheet
30: substrate
32: alignment film
34: liquid crystal layer
40: liquid crystal compound
40A: optical axis
60: exposure device
62: laser
64: light source
65: λ/2 plate
68: polarization beam splitter
70*a*, 70B: mirror
72A, 72B: λ/4 plate
M: laser light
MA, MB: beam
$P_O$: linearly polarized light

What is claimed is:

1. An optical element comprising:

a liquid crystal layer that is formed of a composition including a liquid crystal compound, wherein the liquid crystal layer has a liquid crystal alignment pattern in which a direction of an optical axis derived from the liquid crystal compound changes while continuously rotating in at least one in-plane direction, the liquid crystal compound is twisted and aligned in a thickness direction, the liquid crystal layer further has a resonance structure, and wherein in the liquid crystal layer, a twisted angle of the liquid crystal compound in the thickness direction is 45° to 120°.

2. The optical element according to claim 1, wherein the liquid crystal layer is obtained by immobilizing a cholesteric liquid crystalline phase.

3. An optical sensor comprising:

the optical element according to claim 1.

4. An optical sensor comprising:

the optical element according to claim 2.

5. A method of measuring a refractive index, in which a liquid crystal layer is formed of a composition including a liquid crystal compound, the liquid crystal layer has a liquid crystal alignment pattern in which a direction of an optical axis derived from the liquid crystal compound changes while continuously rotating in at least one in-plane direction, the liquid crystal compound is twisted and aligned in a thickness direction, the liquid crystal layer further has a resonance structure, a relationship between a refractive index of a material disposed on the liquid crystal layer and a position of a peak wavelength of reflected light is grasped in advance as reference data, an object to be measured of which a refractive index is not known is disposed on the liquid crystal layer and a position of a peak wavelength of reflected light is measured to acquire the refractive index of the object to be measured, and wherein in the liquid crystal layer, a twisted angle of the liquid crystal compound in the thickness direction is 45° to 120°.

* * * * *